Feb. 11, 1941.　　　　O. WHITE　　　　2,231,042

OIL BURNER

Filed Feb. 21, 1940

Inventor
Oscar White

WITNESS
H. Wostand

By H. B. Wilson & Co
Attorneys

Patented Feb. 11, 1941

2,231,042

UNITED STATES PATENT OFFICE 2,231,042

OIL BURNER

Oscar White, St. Louis, Mo.

Application February 21, 1940, Serial No. 320,195

1 Claim. (Cl. 158—53)

The invention aims to provide an exceptionally simple and inexpensive, yet a highly efficient oil burner which will insure thorough vaporizing of even low grade fuel oils and effective combustion thereof after thorough mixture of the oil vapor with air, the burner being intended primarily for use in heating stoves, furnaces and the like.

With the foregoing in view, the invention resides in the novel subject matter hereinafter described and claimed, description being accomplished by reference to the accompanying drawing.

Figure 1:
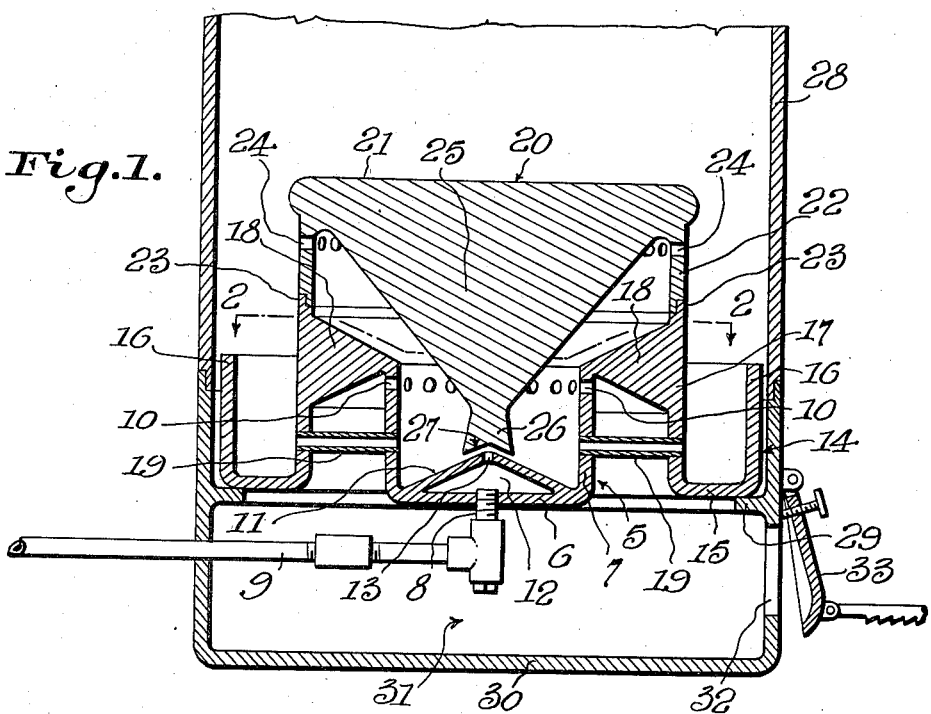
Figure 1 is a vertical sectional view through the burner and a portion of an inner shell of a heating stove within which said burner is mounted.
Figure 2:
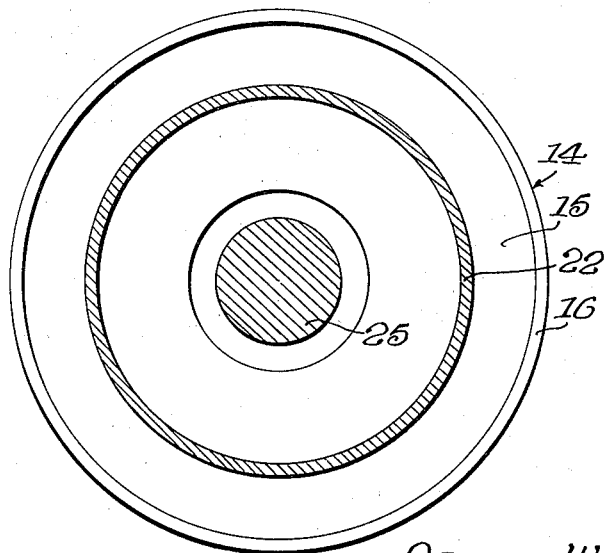
Figure 2 is a horizontal sectional view on line 2—2 of Figure 1.

A preferred construction has been shown and will be specifically described, with the understanding, however, that within the scope of the invention as claimed, minor variations may be made.

An inner pan 5 is provided having a bottom 6 and a continuous side wall 7 rising from said bottom. The bottom 6 is provided with a central oil inlet nipple 8 communicating with an oil line 9, and the side wall 7 is formed with air inlet perforations 10 spaced apart circumferentially and located near the upper edge of said wall. A false bottom 11 is provided cooperating with the bottom 6 in forming an oil heating chamber 12, said false bottom 11 being of conical form and having an oil discharge opening 13 in its apex.

An outer pan 14 of circular form surrounds and is spaced from the inner pan 5, said outer pan 14 having a continuous bottom 15, an outer continuous side wall 16, and an inner continuous wall 17, this wall 17 being preferably of greater height than the outer wall 16. A circular rib 18 joins the inner wall 17 of the outer pan 14 with the upper edge of the wall 7 of the inner pan 5, and the upper and lower sides of said rib preferably converge toward the center of the burner as shown. Radial oil-conducting tubes 19 extend between the two pans 5 and 14 and place their lower portions in communication with each other. These tubes are preferably formed separately from the pans and suitably secured in place but said pans and the rib 18 are preferably cast in a single piece.

A cap 20 is provided having a top 21 and a continuous downwardly projecting side wall 22, said side wall resting removably upon the inner side wall 17 of the pan 14 and having a stepped or similar connection 23 therewith. The upper portion of the cap side wall 22 is formed with circumferentially spaced perforations 24 for escape of the mixture of oil vapor and air formed within the burner. The mixture is guided to the perforations 24 by an inverted conical spreader 25 which projects downwardly from the top 21, the lower portion of said spreader being received in the inner pan 5 in spaced relation with the side wall 7 thereof. This lower end of the spreader 25, in the present disclosure, is formed with a central downwardly projecting boss 26 having a downwardly open socket 27 which receives the upper portion of the false bottom 11 and is spaced therefrom to receive and laterally direct the oil entering through the oil inlet opening 13 of said false bottom. The entire cap 20 and the spreader carried thereby are preferably formed as a one-piece casting.

The burner may be mounted in any preferred manner but for illustrative purposes, I have shown it positioned within an inner shell 28 of a heating stove and resting upon a suitable ledge 29 in upwardly spaced relation with the bottom 30 of said shell, an air space 31 being thus formed between said bottom 30 and the burner to receive and preheat the air for combustion purposes. A suitable air inlet 32 is shown for the space 31, and a controlling door 33 is illustrated to change the amount of air entering said opening, to suit requirements.

The oil supplied to the line 9 is preferably controlled by a conventional float valve (not shown). The oil enters the heating chamber 12 and when starting the burner, sufficient oil is permitted to rise in the inner pan 5 to discharge through the tubes 19 into the outer pan 14. The oil is ignited in this pan and serves to preheat the burner. As the burner becomes heated, the oil within becomes vaporized and mixes thoroughly with the air entering the perforations 10, and this mixture of air and oil vapor discharges through the perforations 24 and burns with a hot flame around the burner. During this burner operation some of the fuel will also find its way into the outer pan 14 through the tubes 19 and will burn to add additional heating efficiency.

Excellent results may be obtained from the exact construction shown and described and it is, therefore, preferably followed. However, attention is again invited to the possibility of making variations within the scope of the invention as claimed.

I claim:

An oil burner comprising an inner pan having a bottom formed with a central oil inlet, a continuous vertical side wall rising from said bottom and having air inlet perforations near its upper end, and a conical false bottom cooperating with the aforesaid bottom in forming an oil heating chamber, the apex of said false bottom being formed with an oil outlet; an outer circular pan surrounding and spaced from said inner pan, said outer pan having a continuous bottom, an outer continuous side wall, and an inner continuous side wall; a continuous rib connecting the upper end of said inner pan side wall with said inner side wall of said outer pan; radial oil conducting tubes placing the lower portions of said inner and outer pans in communication with each other; and a cap having a top and a continuous side wall projecting downwardly from said top and resting removably upon said inner side wall of said outer pan, said cap side wall being provided with air and gas outlet perforations, said top being provided with an inverted conical air and gas spreader which extends downwardly into said inner pan in spaced relation with said side wall thereof, the lower end of said spreader being formed with a downwardly open socket which receives and is spaced from the central portion of said conical false bottom of said inner pan to receive and laterally direct the oil entering through said oil outlet in said apex of said false bottom.

OSCAR WHITE.